United States Patent [19]

Kimura et al.

[11] 4,291,305
[45] Sep. 22, 1981

[54] METHOD FOR GENERATING FORMAT LINES AND CHARACTER DATA IN AN IMAGE SCANNING SYSTEM

[75] Inventors: Tsutomu Kimura; Hitoshi Miyoshi; Sumio Mori, all of Asaka, Japan

[73] Assignee: Fuji Photo Film Co., Ltd., Minami-ashigara, Japan

[21] Appl. No.: 72,773

[22] Filed: Sep. 5, 1979

[30] Foreign Application Priority Data

Sep. 5, 1978 [JP] Japan ............................. 53-108959

[51] Int. Cl.³ .............................................. G06F 3/14
[52] U.S. Cl. ................................... 340/734; 340/703; 340/748; 358/260; 358/263
[58] Field of Search ............... 340/734, 744, 748, 750, 340/703, 701, 749; 358/133, 260, 256, 263; 178/30

[56] References Cited

U.S. PATENT DOCUMENTS

| 3,130,397 | 4/1964 | Simmons | 340/746 |
| 3,444,319 | 5/1969 | Artzt et al. | 178/30 |
| 3,573,787 | 4/1971 | Sandgren et al. | 340/749 |
| 3,643,252 | 2/1972 | Roberts, Jr. | 340/734 |
| 3,872,462 | 3/1975 | Lemelson | 340/748 |
| 4,012,735 | 3/1977 | Keane | 340/750 |
| 4,020,462 | 4/1977 | Morrin | 340/734 |

*Primary Examiner*—Marshall M. Curtis

[57] ABSTRACT

In an image recording or displaying system using a light beam scanning means, format lines are generated in combination with character data to be recorded or displayed together therewith. A format line data memory memorizes the format line data and the output format line data read out therefrom are combined with the character data. The format line data memory is provided with a horizontal pattern memory and a vertical pattern memory. The horizontal pattern memory memorizes various horizontal patterns in the direction parallel to the scanning line of the light beam scanning means. The vertical pattern memory memorizes the kind of the horizontal pattern according to the position of the scanning line. The vertical pattern memory generates the horizontal pattern code according to the scanning line signal and the horizontal pattern memory generates the selected horizontal pattern for every scanning line.

1 Claim, 2 Drawing Figures

METHOD FOR GENERATING FORMAT LINES AND CHARACTER DATA IN AN IMAGE SCANNING SYSTEM

BACKGROUND OF THE INVENTION

1. Field of the Invention

This invention relates to a method for generating frame lines in an image displaying or recording system using raster scanning means, and more particularly to a method for generating frame lines together with character data to be displayed or recorded in an image scanning system like a COM (computer output microfilmer).

2. Description of the Prior Art

In an image scanning system like a COM, the output data of a computer or the like are often recorded or displayed on a recording medium or a display device together with a format like a frame of table or the like as shown in FIG. 1. In order to display or record the output data of the computer or the like together with the format, various methods have been put into practical use as follows.

The first method uses a transparency recorded with the format. The format recorded on the transparency is optically projected on the recording medium and recorded on the recording medium together with the output data directly recorded thereon by means of a scanning light beam. This method is advantageous in case that the sensitivity of the recording medium is low, for example in case of a heat mode recording material to be recorded with a laser beam, in that the recording of the format does not need high sensitivity of the recording medium. However, on the other hand, this method is disadvantageous in that the amount of light or energy of the light to be used for projecting the image of the format must be great enough to record the image on the low sensitivity recording medium.

The second method uses a master format slide or the like to be scanned with a laser beam. The laser beam used for recording the output data is also modulated with respect to the format information in accordance with the transmittivity or reflectivity of the format slide, whereby the format is recorded on the recording medium together with the output data by means of the recording laser beam. This method is disadvantageous in that the format is not recorded with high accuracy. This is because there are errors in parallelism of scanning lines, straightness of scanning lines, diameter of scanning light spot and threshold level of sensors and accordingly the straight thin lines of the format are not read out and/or recorded as straight thin lines. Consequently, the straight thin lines are recorded as disaligned straight lines or curved or waved lines or thick lines or sometimes are not recorded at all.

The third method uses electronically memorized format similarly to the method of recording graphic characters. This method is devided into two kinds as follows. In the first kind, format data are generated in synchronization with the ordinary character data by use of a read only memory for a pattern generator called format line font memory and a frame memory which memorizes format line data for one frame in terms of a code. In the second kind, format data are generated in synchronization with the ordinary character data by use of a frame memory which memorizes format line data for one frame as a dot pattern as a whole.

These two kinds of methods of the third method need a great capacity of the frame memory. For example, in case that one frame involves 160 characters in a horizontal line and 86 characters in a vertical line and each character is formed with 9×16 dots (7×9 dots for the character and the remainder for the space), the frame memory needs the capacity of 8×160×86=110,080 bits in the first kind where the format line font memory has 256 kinds (8 bits), and 9×16×160×86=1,981,440 bits in the second kind.

Though the first kind appears not to need so much capacity as the second kind, the first kind needs the font memory in addition. Accordingly, both the first and second kinds need a great capacity of memory.

SUMMARY OF THE INVENTION

The primary object of the present invention is to provide a method for generating frame lines or format lines using an electronic process which does not need a large capacity of memory.

Another object of the present invention is to provide a method for generating frame lines without a format slide.

Still another object of the present invention is to provide a method for generating frame lines or format lines without an optical projecting system or a scanning system.

A further object of the present invention is to provide a method for generating format lines capable of generating a number of format data without enlarging the capacity of a frame memory.

The format line generating method in accordance with this invention uses a format line data memory in which format line data are memorized and outputs the format line data read out from the memory in combination with the character data. In this method, the format line data memory has a horizontal pattern memory and a vertical pattern memory and in the horizontal pattern memory are memorized horizontal patterns extending horizontally in the direction parallel to the scanning direction of the recording device and in the vertical pattern memory are memorized the kinds of the horizontal patterns in terms of code at the vertical position of the scanning lines. The kind of the horizontal pattern in terms of the horizontal pattern code is given by the vertical pattern memory according to the scanning line signals and the horizontal patterns are generated for each scanning line by the horizontal pattern memory.

The format line data referred to above means the information consisting of a number of dots arranged in the pattern of a format or frame including horizontal and vertical lines to be used for presenting a table or list. Further, the aforementioned horizontal pattern means a pattern consisting of dots arranged in a horizontal line in a predetermined pattern which is classified into a predetermined number of patterns. The horizontal pattern as a whole is memorized in the horizontal pattern memory for each scanning line. Since the pattern itself is memorized, there is no error in reading and recording the horizontal straight line or the like.

DESCRIPTION OF THE PREFERRED EMBODIMENTS

Now a preferred embodiment of the present invention will be described in detail hereinbelow with reference to FIGS. 1 and 2.

Figure 1:
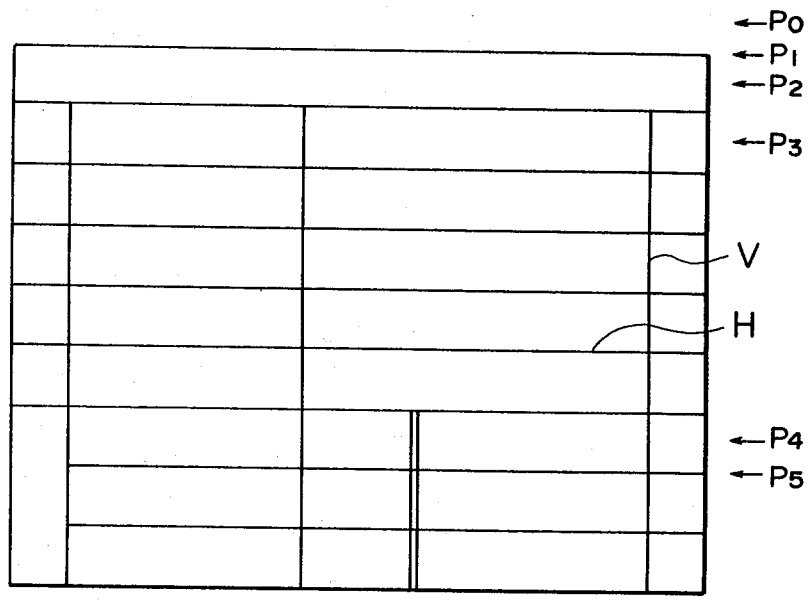
FIG. 1 shows an example of a format.

Referring to FIG. 1, a format consists of horizontal lines H and vertical lines V extending at right angle with respect to each other. The output data to be recorded together with the format are carried on the scanning lines running in parallel to the horizontal lines and recorded together with the format.

In case of the format as shown in FIG. 1, for example, the horizontal pattern is classified into five kinds of P1 to P5. P0 indicates a horizontal pattern of no dot at all. P1 is a horizontal pattern consisting of a single horizontal line section having a predetermined length that is represented by a signal of a single pulse having a long period of turn ON. P2 is a horizontal pattern consisting of two end turn ON sections represented by a pair of sharp pulses having a long turn OFF section therebetween. P3 is a horizontal pattern consisting of five pulses separated at predetermined intervals, P4 consists of seven pulses separated at predetermined intervals as shown and P5 is a straight line section shorter than P1. Thus, including the pattern of P0 only six horizontal patterns constitute the format as shown in FIG. 1.

Therefore, in case of the format as shown in FIG. 1, six horizontal patterns are memorized in the horizontal pattern memory and the positions of the six kinds of horizontal patterns are memorized in the vertical pattern memory. In other words, in the horizontal pattern memory, codes of 0,1,2, . . 5 representing the above horizontal patterns P0, P1, P2, . . P5 are memorized in the form of "1" for the turn ON section and "0" for the turn OFF section. For example, the horizontal pattern P0 is memorized in the form of "0,0,0, . . 0" and P2 in the form of "0,0,0, . . 0,1,0,0, . . . 0,1,0, . . 0,0,0". In the vertical pattern memory, the horizontal pattern code is memorized in accordance with the level of the scanning lines like "0,0, . . . 0,1,2,2, . . . 2,2,1,3,3, . . . 3,1,3,3, . . . . . . ,3,1,4,4, . . . . . ,4,5,5, . . . 4,5,4, . . . 4,5,4,4, . . . ,4,1,0,0, . . . 0,0" in case of the format as shown in FIG. 1.

Figure 2:
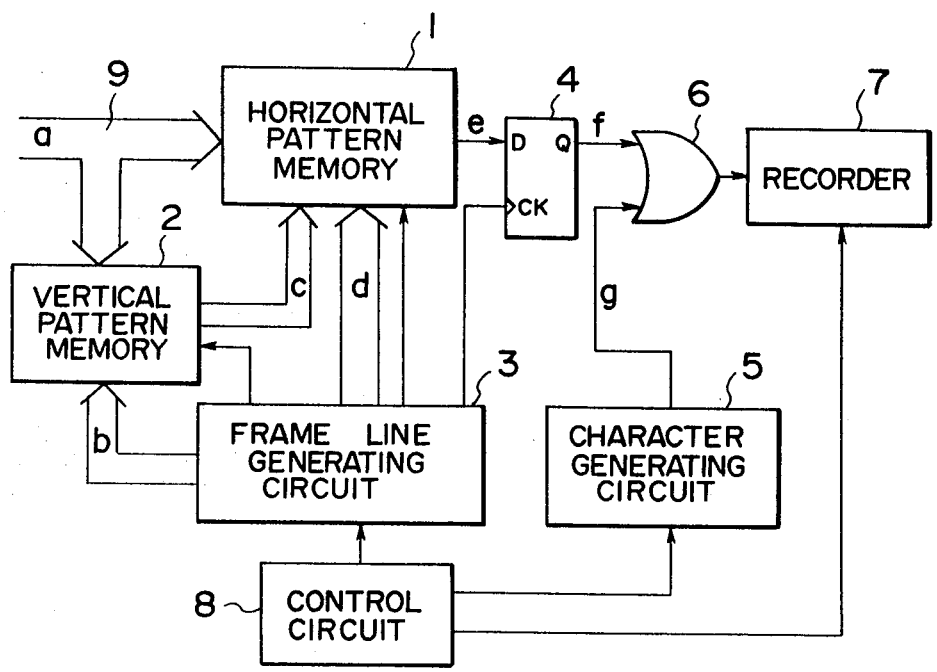
FIG. 2 shows an example of a format line generating system to be used for carrying out the method of this invention.

FIG. 2 shows an example of a format line generating system in a block diagram. In the system as shown in FIG. 1, a laser beam scanner for recording images as shown in Japanese Patent Laid Open No.sho-52(1977)-108142 can be used. Referring to FIG. 2, input data a to be memorized for generation of format lines are input into a horizontal pattern memory 1 and a vertical pattern memory 2 through a data bus 9. The horizontal pattern memory 1 memorizes the horizontal pattern data such as P0, P1, . . . P5 at the corresponding positions of pattern based on the input data a coming through the data bus 9. The vertical pattern memory 2 memorizes the code array of the horizontal pattern based on the input data a from the data bus 9. The horizontal and vertical pattern memories 1 and 2 memorize the data under the control of a control circuit 3 serving as a format line generating circuit.

The control circuit 3 outputs a scanning line signal b to be input into the vertical pattern memory 2 as an address input. With this address input, the vertical pattern memory 2 outputs the pattern code of the horizontal pattern code as a pattern select signal c. The horizontal pattern memory 1 selects the corresponding horizontal pattern based on the received pattern select signal c. Further, the control circuit 3 outputs a horizontal address signal d as the horizontal scan advances. Thus, the horizontal pattern memory 1 outputs a format bit pattern signal e corresponding to the horizontal address signal d among the horizontal patterns each consisting of a group of "1" and "0". The format bit pattern signal e is input into a D-type flipflop 4 which outputs format line data signal f based on the input signal e under control by the clock signal from the control circuit 3. The format line data signal f is input into a recorder 7 through an OR-gate 6 together with character data g from a character generating circuit 5. Thus, the character data g and the format line data f are combined together and recorded or displayed together. The combination of the two kinds of data f and g is made so that the character data g are recorded or displayed between format lines H and V. The thickness of the format lines H and V can be enlarged by representing one format line with more than one dot.

In accordance with the method in accordance with the present invention as described above, the capacity of the memory can be reduced as calculated hereinbelow.

Assuming that the number or kind of the horizontal pattern is 16 instead of 6 in the example shown in FIG. 1, the capacity required for the horizontal pattern is $9 \times 160 \times 16 = 23,040$ bits, and that for the vertical pattern is $16 \times 86 \times 4 = 5,504$ bits, which sum to 28,544 bits.

Further, the capacity can be reduced by utilizing a known data compression method like Run length method for memorizng the horizontal and vertical pattern. With such a method, the capacity required can be further reduced to $\frac{1}{8}$ to 1/10. Hence, the capacity of the memory required in this invention is about $\frac{1}{4}$ or further about 1/10 to 1/70 of the capacity conventionally required in said first kind of method of the electronic method, and about 1/70 or further about 1/200 to 1/700 of the capacity conventionally required in said second kind of method of the electronic method.

We claim:

1. In an image recording or displaying system using a light beam scanning means employing a raster scanning light beam modulated by a signal carrying character data, a method of generating format data to be combined with said character data so as to record or display format lines together with characters, comprising the steps of: preparing a horizontal pattern memory for memorizing a plurality of kinds of horizontal patterns in a direction parallel to scanning lines of the raster scanning means, preparing a vertical pattern memory for memorizing pattern codes which indicate the kind of said horizontal patterns with respect to vertical positions of the raster, causing said horizontal pattern memory to memorize all kinds of horizontal patterns of a format to be recorded or displayed together with the characters, causing said vertical pattern memory to memorize said pattern codes to memorize which kind of said all kinds of horizontal patterns of said format should be recorded or displayed at which vertical position of the raster, inputting a scanning line signal into said vertical pattern memory to cause the same to output one of said pattern codes in the form of a pattern select signal according to the vertical position of the raster, and inputting the pattern select signal into said horizontal pattern memory to cause the same to output one of said horizontal patterns in the form of a pattern signal according to the input pattern code.

* * * * *